(12) United States Patent
Boyer

(10) Patent No.: US 7,845,832 B2
(45) Date of Patent: *Dec. 7, 2010

(54) LAMP DEVICE AND METHOD TO RETROFIT A LIGHTING FIXTURE

(75) Inventor: John Delmore Boyer, Lebanon, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/115,849

(22) Filed: May 6, 2008

(65) Prior Publication Data

US 2008/0278956 A1 Nov. 13, 2008

Related U.S. Application Data

(63) Continuation of application No. 11/745,126, filed on May 7, 2007, now Pat. No. 7,677,766.

(51) Int. Cl.
 *F21V 29/00* (2006.01)
(52) U.S. Cl. .............. 362/294; 362/249.02; 362/373; 362/647
(58) Field of Classification Search .......... 362/249, 362/252, 294, 345, 373, 545, 800, 647, 649, 362/650, 249.01, 249.02, 246, 247
See application file for complete search history.

(56) References Cited

U.S. PATENT DOCUMENTS

| | | | |
|---|---|---|---|
| D127,833 S | 6/1941 | Price | |
| 2,280,406 A | 4/1942 | Gazin | |
| 2,298,176 A | 10/1942 | Schwartz | |
| D134,595 S | 12/1942 | Van Es | |
| 2,362,100 A | 11/1944 | Schwartz | |
| 2,483,876 A | 10/1949 | Boyer | |
| 3,027,481 A | 3/1962 | Thompson et al. | |

(Continued)

OTHER PUBLICATIONS

Pursuant to Section 609 and 707.05(b) of the MPEP and 37 CFR 1.97-1.99, the undersigned is bringing the following copending U.S. Patent Applications, of which he is aware to the attention of the Examiner in the above-identified application. U.S. Appl. No. 11/745,126, filed May 7, 2007, Title: LED Lamp Device and Method to Retrofit a Lighting Fixture; Assignee: LSI Industries, Inc.

*Primary Examiner*—Thomas M Sember
(74) *Attorney, Agent, or Firm*—McDermott Will & Emery LLP

(57) ABSTRACT

A device and method for retrofitting a light fixture from use with a lamp socket that employs an incandescent or metal halide lamp, to use with another lamp assembly. The lamp fixture has a collar with a base and an annular outer wall extending out from the base. The LED lamp device includes a neck base having an annular outer wall having a shaped outside surface that is placed into direct surface contact with the inner surface of the annular outer wall of the collar, to establish an effective heat-transferring interface. The shaped outer surface of the neck base provides proper fitting of the LED lamp device into the lighting fixture, and provides a heat-transferring interface over substantially all of the outer surface of the neck base, to dissipate heat away from the LED module. Aluminum material provides high thermal conductivity, light weight, availability, and low cost.

57 Claims, 19 Drawing Sheets

U.S. PATENT DOCUMENTS

| | | |
|---|---|---|
| 3,533,648 A | 10/1970 | Thieberger |
| 3,588,490 A | 6/1971 | Nicholl |
| 3,808,081 A | 4/1974 | Okuhara et al. |
| 4,029,954 A | 6/1977 | Moyer |
| D246,202 S | 10/1977 | Oppermann |
| 4,104,711 A | 8/1978 | Carter |
| 4,521,836 A | 6/1985 | Puttemanns et al. |
| D279,823 S | 7/1985 | Parker et al. |
| 4,763,233 A | 8/1988 | Poyer |
| 4,881,157 A | 11/1989 | Pahl |
| 5,314,148 A | 5/1994 | Jones |
| 5,377,088 A | 12/1994 | Lecluze |
| 5,562,343 A | 10/1996 | Chan et al. |
| 5,630,663 A | 5/1997 | Ling et al. |
| D413,997 S | 9/1999 | Jandrisits et al. |
| 5,993,022 A | 11/1999 | Neyer et al. |
| 6,082,878 A | 7/2000 | Doubek et al. |
| 6,332,703 B1 | 12/2001 | Tamaoki et al. |
| 6,425,678 B1 | 7/2002 | Verdes |
| D464,454 S | 10/2002 | Suzuki et al. |
| D465,046 S | 10/2002 | Layne et al. |
| 6,480,389 B1 | 11/2002 | Shie |
| 6,739,734 B1 | 5/2004 | Hulgan |
| 6,773,138 B2 * | 8/2004 | Coushaine ................. 362/656 |
| 6,779,908 B1 | 8/2004 | Ng |
| 6,787,999 B2 | 9/2004 | Stimac |
| 6,827,471 B1 | 12/2004 | Benghozi |
| 6,905,227 B2 | 6/2005 | Wu |
| 6,913,371 B2 | 7/2005 | Ping |
| 6,964,499 B2 | 11/2005 | Colip et al. |
| 6,982,518 B2 | 1/2006 | Chou |
| D524,979 S | 7/2006 | Leung |
| 7,075,224 B2 * | 7/2006 | Coushaine ................. 313/498 |
| 7,093,958 B2 * | 8/2006 | Coushaine ............. 362/249.02 |
| 7,100,881 B2 | 9/2006 | Worrall |
| 7,111,963 B2 | 9/2006 | Zhang |
| 7,166,955 B2 * | 1/2007 | Coushaine et al. ............ 313/46 |
| D541,957 S | 5/2007 | Wang |
| D558,378 S | 12/2007 | Rashidi |
| 2002/0093820 A1 * | 7/2002 | Pederson .................... 362/241 |
| 2005/0024870 A1 * | 2/2005 | Coushaine ................. 362/249 |
| 2005/0052864 A1 | 3/2005 | Colip et al. |
| 2006/0012997 A1 | 1/2006 | Catalano |
| 2006/0109640 A1 | 5/2006 | Fong |
| 2007/0008723 A1 | 1/2007 | Hampton |
| 2007/0230172 A1 * | 10/2007 | Wang ........................ 362/249 |
| 2008/0186704 A1 * | 8/2008 | Chou et al. ................. 362/249 |

* cited by examiner

LAMP DEVICE AND METHOD TO RETROFIT A LIGHTING FIXTURE

RELATED APPLICATIONS

This application is a continuation of U.S. application Ser. No. 11/745,126 filed May 7, 2007, now U.S. Pat. No. 7,677,766.

FIELD OF THE INVENTION

In one aspect, the disclosure is related to lighting. More specifically, the disclosure is directed to retrofitting existing lighting fixtures.

BACKGROUND OF THE INVENTION

Outdoor lighting has evolved over the years from the earliest use of incandescent lamps, through the use of fluorescent, high intensity discharge (HID), and mercury-vapor lamps, and more recently to light emitting diode (LED) lamps. LED lamps offer several advantages, including improved quality, performance, lifespan and cost, and their use and popularity have been growing. LED lighting also provides, and has the potential for further providing, reduced power consumption per unit lumen.

One drawback of LED lighting systems is the cost and inconvenience of removing conventional, non-LED-based light fixtures and installing new light fixtures that are design and optimized for LED-based lamps. To defray this expense, attempts have been made to retrofit, or force-fit, LED lamp technology into non-LED lamp fixtures. Examples include the incorporation of LED lamps inside and on the outside surface of "bulb" style lamps, with threaded electrical connections so that the LED bulb lamp can be screwed into a conventional socket.

An alternative means for retrofitting LED lamps into a conventional light fixture is to replace both the conventional bulb and the electrical socket with an LED lamp assembly which incorporates or is augmented with a suitable power and control systems for LED service. Nevertheless, such retrofitting efforts often fail to address one or more of the functional differences characteristic of LED lamps. In particular, LED lamps are sensitive to heat generated by the LED itself, and may lose efficiency unless the heat and local temperature increases are minimized. LED lamps are also well known to emit light in a lambertian distribution, whereas most conventional incandescent and fluorescent lamps emit a spherical light pattern. Positioning and controlling the light emitted from an LED requires a different technique than the light from a conventional lamp. Furthermore, typical power converters that convert off-line (110-377V AC) to 24V, constant current to drive the LEDs, are bulky and do not conveniently install into such socket-type light fixtures.

SUMMARY OF THE INVENTION

In one aspect, the disclosure relates to a device and method for retrofitting a light fixture from use with a lamp socket that employs a conventional incandescent or metal halide lamp powered by off-line voltage, to use with a light emitting diode (LED)-based lamp assembly. The conventional non-LED lamp fixture is of a type having a collar that has a base and an annular outer wall extending out from the base. The base of the lamp fixture is securable to a structure, such as a pole, canopy, or wall. The LED lamp device has an annular outer wall having a shaped outside surface that is placed into direct surface contact with the inner surface of the annular outer wall of the collar, to establish an effective heat-transferring interface between the LED lamp device and the collar, and a means for affixing an LED module comprising at least one LED.

In various embodiments, the material of construction of the LED lamp device is a metal or engineering plastic having a high thermal conductivity. Metals are selected from aluminum, copper, brass, bronze, iron and steel. Aluminum is particular attractive for its high thermal conductivity, light weight, availability, and low cost. The shaped outer surface of the LED lamp device provides proper fitting of the LED lamp assembly into the lighting fixture, and provides a heat-transferring interface over substantially the entire outer surface of the adapter sleeve, to dissipate heat away from the LED module and its power and control units.

In one embodiment, the LED lamp module includes a light board 81 to which is affixed one or a plurality of LEDs, and optionally LED power and control components.

The means for affixing the LED module to the LED lamp device is generally disposed at the distal end, and a recess formed in the distal end within which the LED module is positioned. In one embodiment, a protective lens or transparent plate is positioned over the recessed LED module for protection from the environment and for personnel safety. Power wiring from the LED module to a power source is routed through openings in the LED lamp device and collar.

In another aspect, the disclosure also relates to the above-mentioned LED lamp device.

In one embodiment, the LED lamp device, and its use in a retrofitable retrofitting light fixture, can comprise an adapter sleeve having the annular outer wall with the shaped outside surface, and 2) a lamp head moveably affixed to the adapter sleeve that comprises a means for affixing the LED module. In one embodiment, the lamp head has an annular base portion having a proximal rim that associates with a shoulder on the annular wall of the adapter sleeve both to provide a broad contact interface for conducting heat through and away from the lamp head to the adapter sleeve, and to permit movement, such as rotation, of the lamp head with respect to the adapter sleeve, and more typically so that the LED module revolves around an axial centering line of the adapter sleeve. The LED module has a centerline disposed at an angle from the axial centering line of the adapter sleeve of from about 10° to about 70°.

The LED lamp device can be configured with modular design features, such that the LED lamp device of the first embodiment can also be used as the adapter sleeve, configured with the shoulder on the annular wall so that a separate lamps head can be added for modifying the direction and distribution of the LED light, as well as the appearance of the LED lamp device itself.

In another aspect, the disclosure relates to a method for retrofitting an existing lamp fixture to replace a threaded lamp socket with an LED-based lamp assembly, the lamp fixture having a collar having an annular wall with an inner wall surface, and a base to which the threaded lamp socket is secured for attaching the lamp fixture to the structure, and for communicating electrical power from an electrical power source to the threaded socket lamp. The method can include removing the threaded lamp socket from the collar; providing an LED lamp device having an annular wall having a shaped outside annular surface and an LED module; affixing the LED lamp device to the lamp fixture, wherein the shaped outside annular surface is placed into direct surface contact with the inner surface of the annular wall of the metallic collar, to establish a heat-transferring interface between the adapter sleeve and the collar, and connecting the electrical power source to the LED module.

The disclosure also relates to the ornamental shape and design of the LED lamp device.

DETAILED DESCRIPTION OF THE INVENTION

Figure 1:
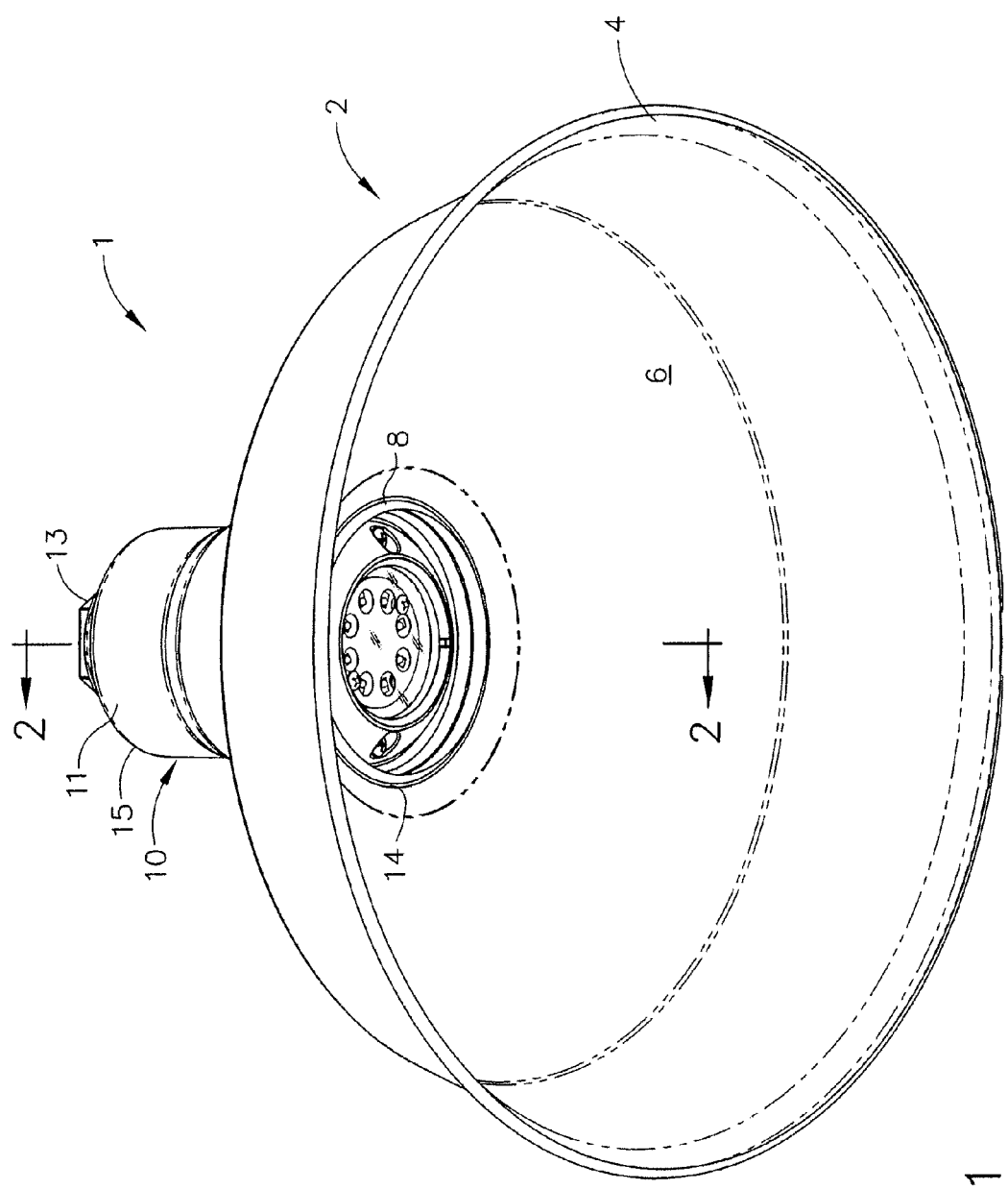
FIG. 1 shows a perspective view of one embodiment of a light fixture having one embodiment of a lamp with a light module.
Figure 2:
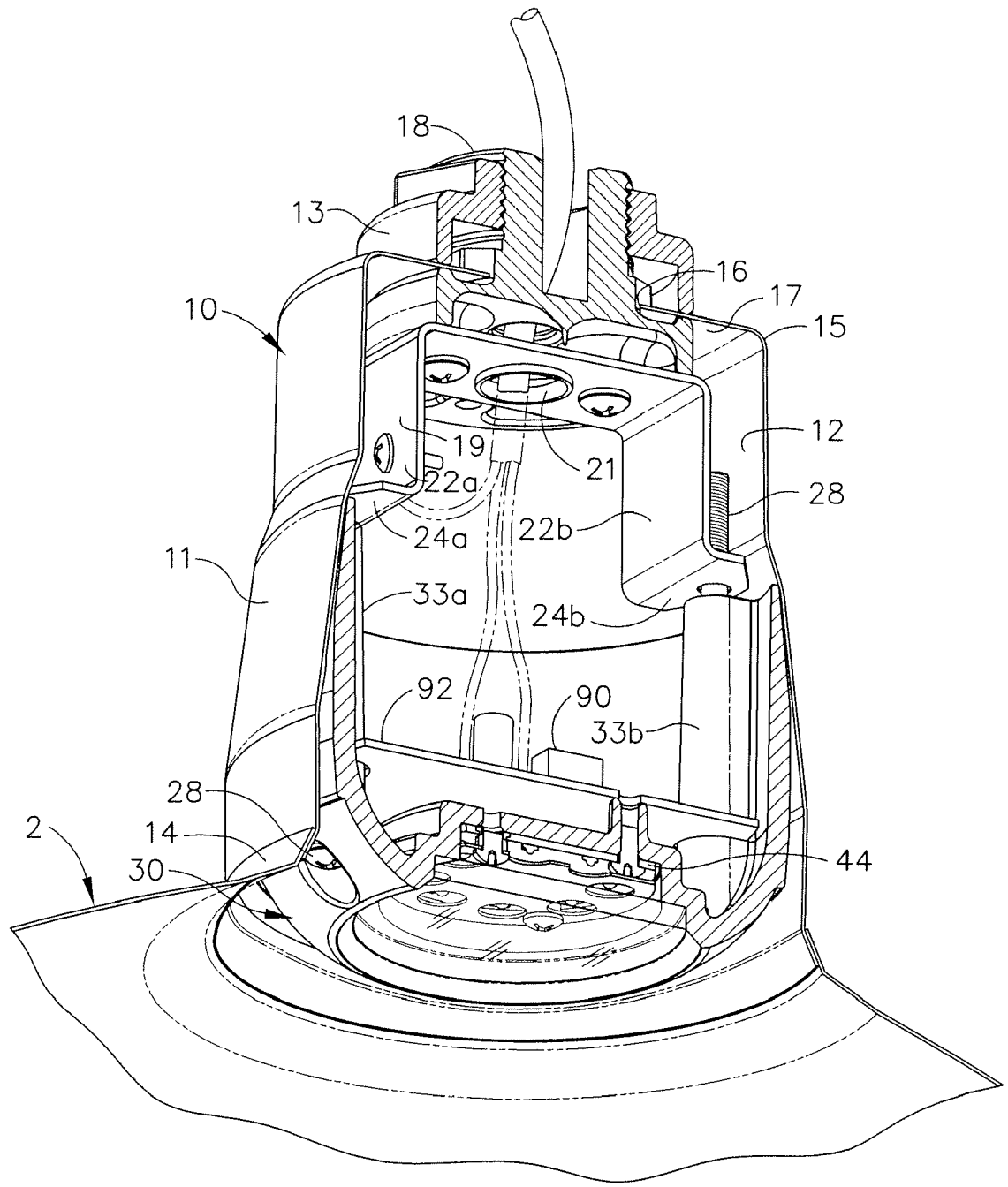
FIG. 2 shows a sectional view of the light fixture and lamp device taken through line 2-2 of FIG. 1.

In one embodiment, a lighting fixture and a lamp is shown in FIGS. 1 and 2. The embodiment The light fixture 1 includes a shade 2 and a collar 10. The shade 2 has a frustoconical shade wall 6 that defines a distal rim 4 and a proximal rim 8 that associates with the collar 10. The collar 10 has an annular outer wall 11 having an inner surface 12. The outer wall 11 is generally a cylindrical shape, though more typically having one or more sidewall portions that taper outwardly from a proximal end 15 to the distal end. The shade 2 can be fixed to the outer distal rim 14 of the collar 10.

As shown in FIG. 2, the base 17 located at the proximal end 15 of the collar has an opening 16. The securing means is shown as an adapter 18 that extends through the opening 16 of the base 17, and has an opening there through and a first end. The first end is secured, such as with threads, to an electrical conduit or cord (not shown) associated with the structure, such as a light pole, fence, and building wall, ceiling or roof (not shown). A nut 13 threads onto the outside threads of the adapter 18 to secure the base 17 of the collar 10 to the adapter 18 and to the structure. A collar bracket 19 is secured to the adapter 18, using screws or equivalent means. An opening 21 passing through the collar bracket 19 and the opening in the adapter 18 provide access for electrical power wiring to within the light fixture. The collar bracket 19 also has a pair of distally extending arms 22a and 22b disposed on opposite sides of the opening 21, leading to respective tabs 24a and 24b.

The shade 2 and collar 10 can be made of metal, such as aluminum or steel, or engineering plastic, that can efficiently conduct heat to the surrounding air, and have a thermal conductivity of at least about 50 W/mK, or at least about 200 W/mK.

Figure 3:
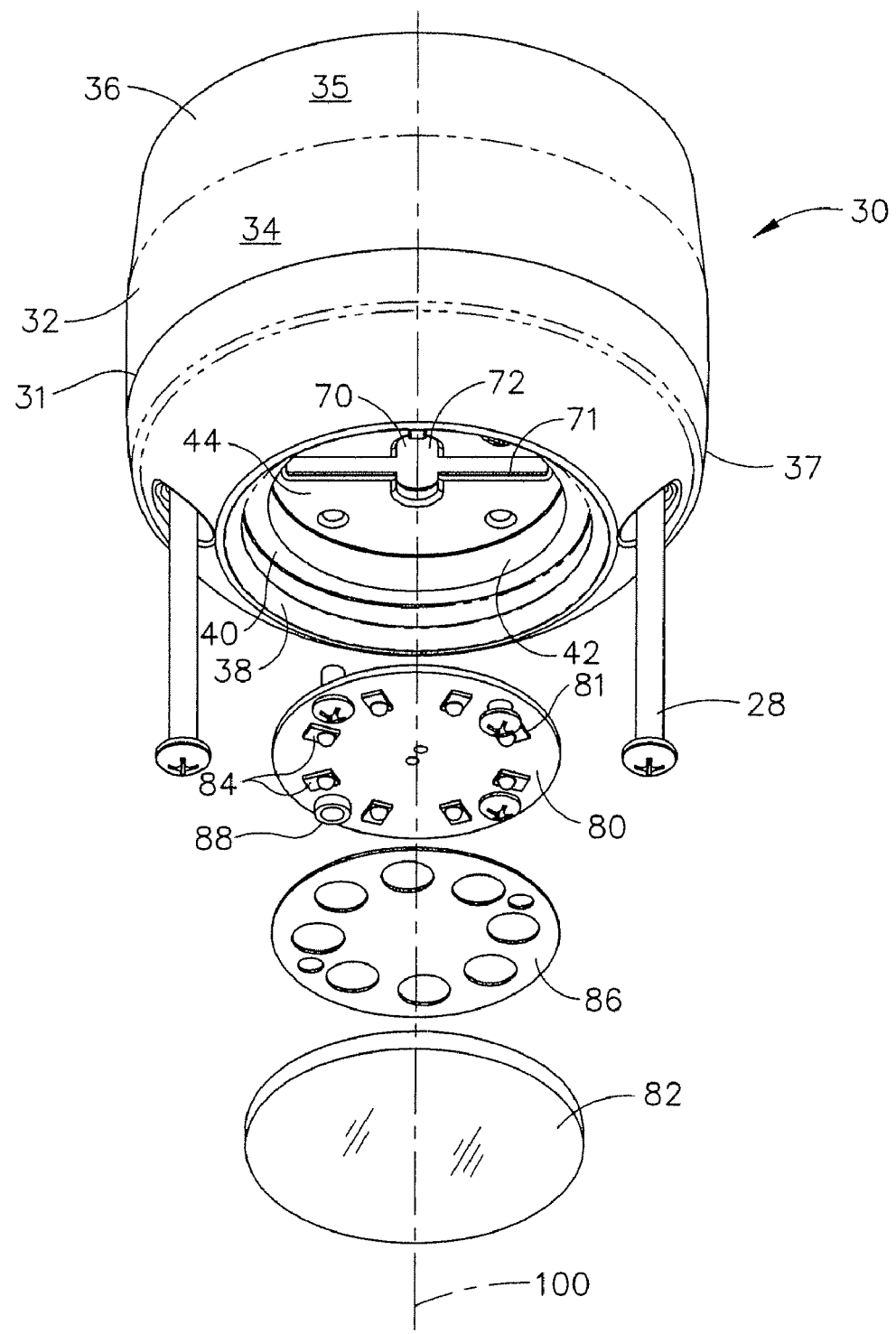
FIG. 3 shows an exploded view of the lamp device of FIG. 1.
Figure 4:
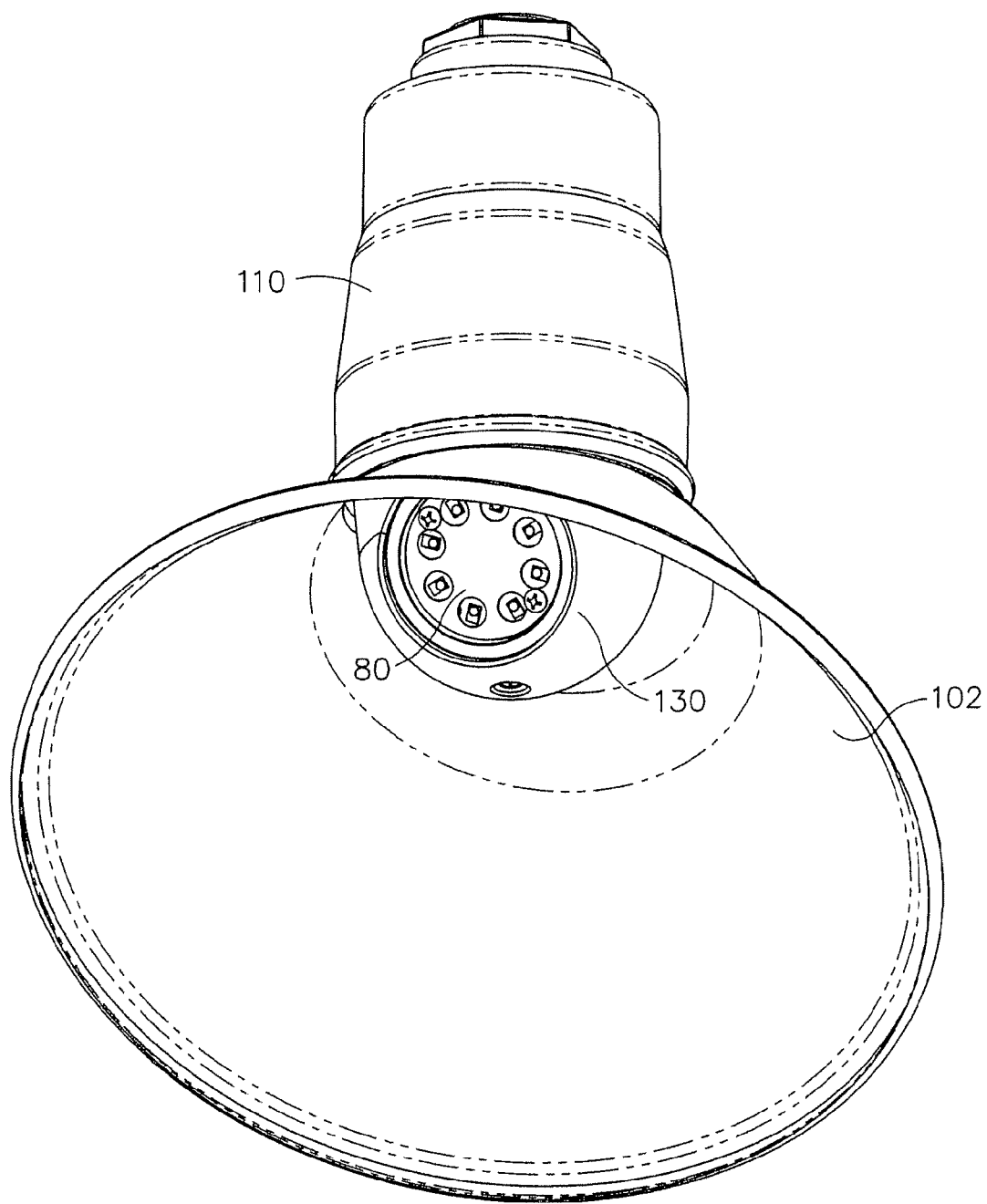
FIG. 4 shows a perspective view of an alternative light fixture having a second embodiment of the lamp device.

Disposed within the light fixture 1 is, in one embodiment, an LED lamp device 30. FIG. 3 shows the LED lamp device 30 after the shade 2 and collar 10 are removed in order to better illustrate the embodiment. The illustrated LED lamp device 30 has a neck base 31 having an annular wall 32 having a shaped outside surface 34 that is placed into direct surface contact with the inner surface 12 of the annular wall of the collar 10, to establish a heat-transferring interface between the LED lamp device 30 and the collar 10. The neck base 31 also has a recess 44 within which is disposed an LED module 80 that comprises an LED light board 81 to which is secured at least one LED 84. In another embodiment, other light sources can be used in place of the LEDS shown and described herein.

A securement, such as a threaded bolt 28, extends through flanges 33a, 33b to secure the LED lamp device 30 to the tabs 24a,b of the adapter 19. The annular wall 32 has a proximal annular rim 36 that extends down proximate the outer wall 11 of the collar 10. The proximal portion 35 of the outer surface 34 of the wall 32 that extends toward the rim 36 is configured and shaped to be placed into direct surface contact with the inner surface 12 of the annular wall 11 of the collar 10, whereby a heat-transferring interface is established between the LED lamp device 30 and the collar 10. In one embodiment, intimate, near continuous contact is provided among the surfaces of the annular wall 32 of the neck base 31 and annular wall 11 of the collar 10 provides effective heat transfer to dissipate the heat generated by the LED power source and controllers. The particular annular wall 32 is shown with a proximal outer surface 35 that is tapered or angled, in one embodiment, approximately between about −5° and about +10°, and in a more specific embodiment between about 1° and about 5°, from vertical toward the centerline, though other surface taper properties can be formed or machined into the adapter sleeve to form the intimate surface contact with the inner surface of the collar.

At the distal end of the neck base 31 is shown a pair of concentric, nested recesses 40 and 44, disposed substantially centered on the centerline 100. The outer recess 40 defines an upper annular sidewall 38 and the inner recess 44 defines a lower annular sidewall 42. The inner recess 44 is sized to retain the LED light board 81. In the floor of the recess 44 is an opening 70 through which pass electrical wiring for power and control of the LEDs. The opening 70, in one embodiment, is formed as an elongated slot 71 having a length and a width sufficiently sized to allow passing there through the LED light board 81. In another embodiment of the LED lamp device 30, the opening has at least one secondary slot 72 extending transversely from a middle portion along the length of the elongated slot 71, that permits passage of the control wiring that extends normal to the PCB of the LED light board 81.

The inner recess 44 can be a circular shape, though other shapes can be used. The recess 44 can also be offset from the centerline 100 as desired. The outer recess 40 generally overlays the inner recess 44, and retains a lens or transparent plate 82 through which the light from the LEDs 84 can emit. The lens 82 protects the LEDs and the electronics from the environment and provides personnel safety. The lens 82 is secured within the recess 40 with adhesive or other well known securing means.

The LED light board is, in one embodiment, a printed circuit board (PCB) on which is mounted one or a plurality of LEDs. The circuitry for controlling and powering the LEDs can also be mounted on the PCB, or remotely. The LEDs can be of any kind and capacity. The LEDs can emit colored or white light; they can have an optic built-in with the LED or placed over the LED, or no optic; and they can have a surrounding reflector that re-directs low-angle LED light.

In one embodiment, the LEDs 84 are white LEDs each comprising a gallium nitride (GaN)-based light emitting semiconductor device coupled to a coating containing one or more phosphors. The GaN-based semiconductor device emits light in the blue and/or ultraviolet range, and excites the phosphor coating to produce longer wavelength light. The combined light output approximates a white output. For example, a GaN-based semiconductor device generating blue light can be combined with a yellow phosphor to produce white light. Alternatively, a GaN-based semiconductor device generating ultraviolet light can be combined with red, green, and blue phosphors in a ratio and arrangement that produces white light. In yet another embodiment, colored LEDs are used, such are phosphide-based semiconductor devices emitting red or green light, in which case the LED module 80 produces light of the corresponding color. In still another embodiment, the LED light board includes red, green, and blue LEDs distributed on the PCB in a selected pattern to produce light of a selected color using a red-green-blue (RGB) color composition arrangement. In this latter embodiment, the LED light board can be configured to emit a selectable color by selective operation of the red, green, and blue LEDs at selected optical intensities.

The LED lamp device 30 can receive an external power supply having an off-line voltage of 110-277 V, depending upon the local power system. In one embodiment, an external low voltage power system can be provided that converts the off-line voltage of 110-277 V AC from the structure to the 24V constant current required for the LED power and control components of the LED light board 81. In another embodiment, the LED lamp device is configured for installation of an integral LED power and control module 90, which converts off-line power directly to the low voltage constant current power required by the LEDs. The drivers and controllers of LED boards are routinely powered with 24V constant current, which is supplied by separate off-line power converts which are generally bulky, elongated and ill-suited for incorporation into such conventional light fixtures. The components of the LED power and control module 90 can be assembled on a board or substrate 92 that can be secured within the neck base 31, as shown in FIG. 2, with the substrate 92 inboard and in heat-conducting contact with the floor of inner recess 44.

In another embodiment, the neck base 31 containing the LED power and control module 90 can be filled with an electrical potting compound, such as epoxy to complete encase the components. The potting provides several benefits, including a water and corrosion barrier, component shock absorption, and a heat sink for dissipating and removing heat generated by the LED power and control module 90.

FIG. 3 shows a cover plate 86 having a plurality of opening that register over the LEDs 84 to allow light transmission. A spacer ring 88 is used to stand off the cover plate 86 from the LED light board 81 and to control the positioning of the edges of the openings in the cover plate 86 from the LEDs 84. The cover plate can be made from a reflective material or have a reflective coating, or other decorative pattern, which also serves to disguise the electronic circuitry of the LED light board 80.

In another alternative embodiment, a control means for dimming the light output can be provided, either as an external control means associated with the structure, or an internal control means built into the LED lamp device with control wiring passing externally to the structure.

Various types, sizes and shapes of such lamp fixtures are known, though each generally provides a collar that conventionally retains and houses, in a retrofitted lamp fixture embodiment, the threaded socket of the incandescent lamp.

Figure 5:
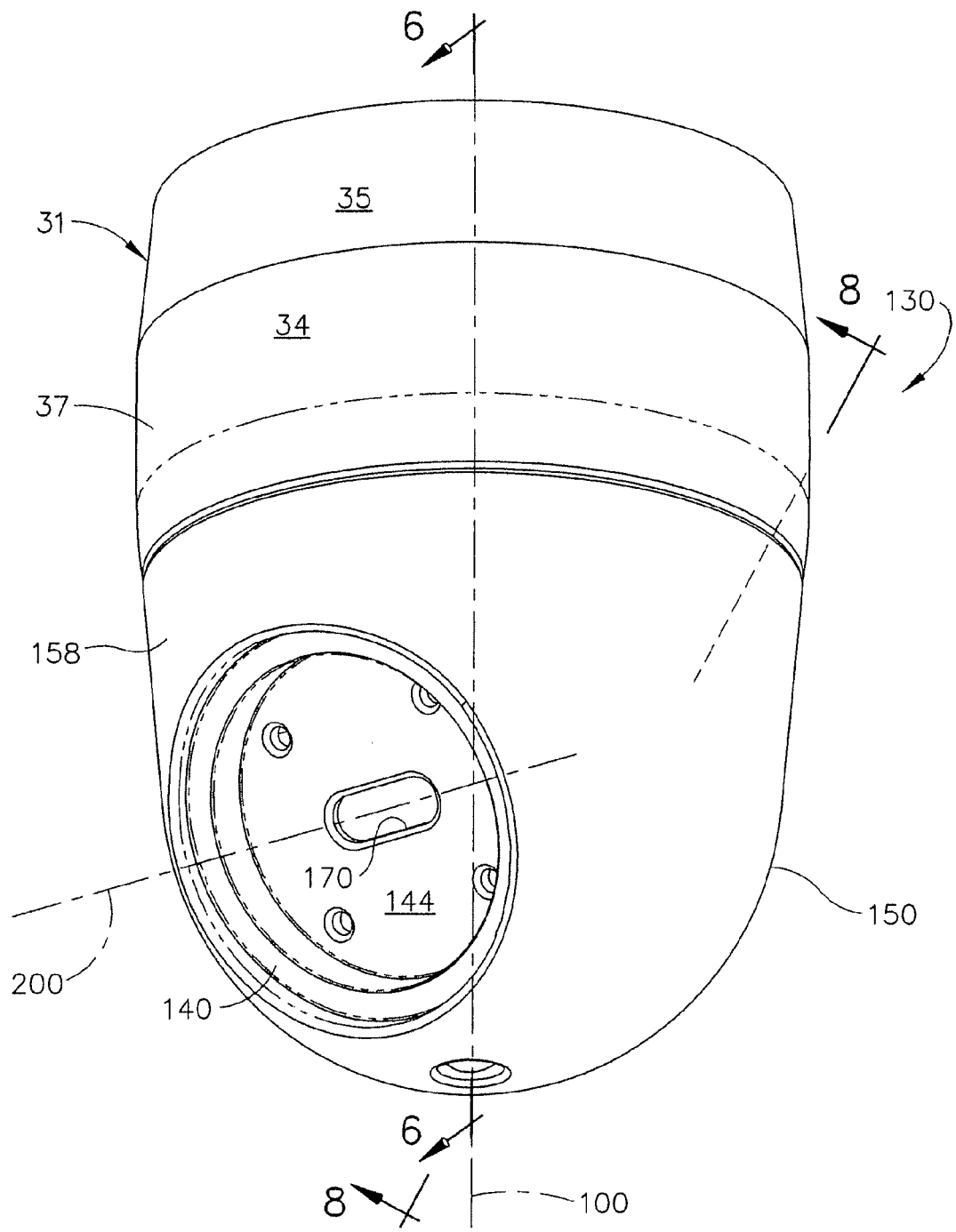
FIG. 5 shows a perspective view of the lamp device of FIG. 4 isolated from the light fixture and the light module, showing a neck base and a lamp head.
Figure 6:
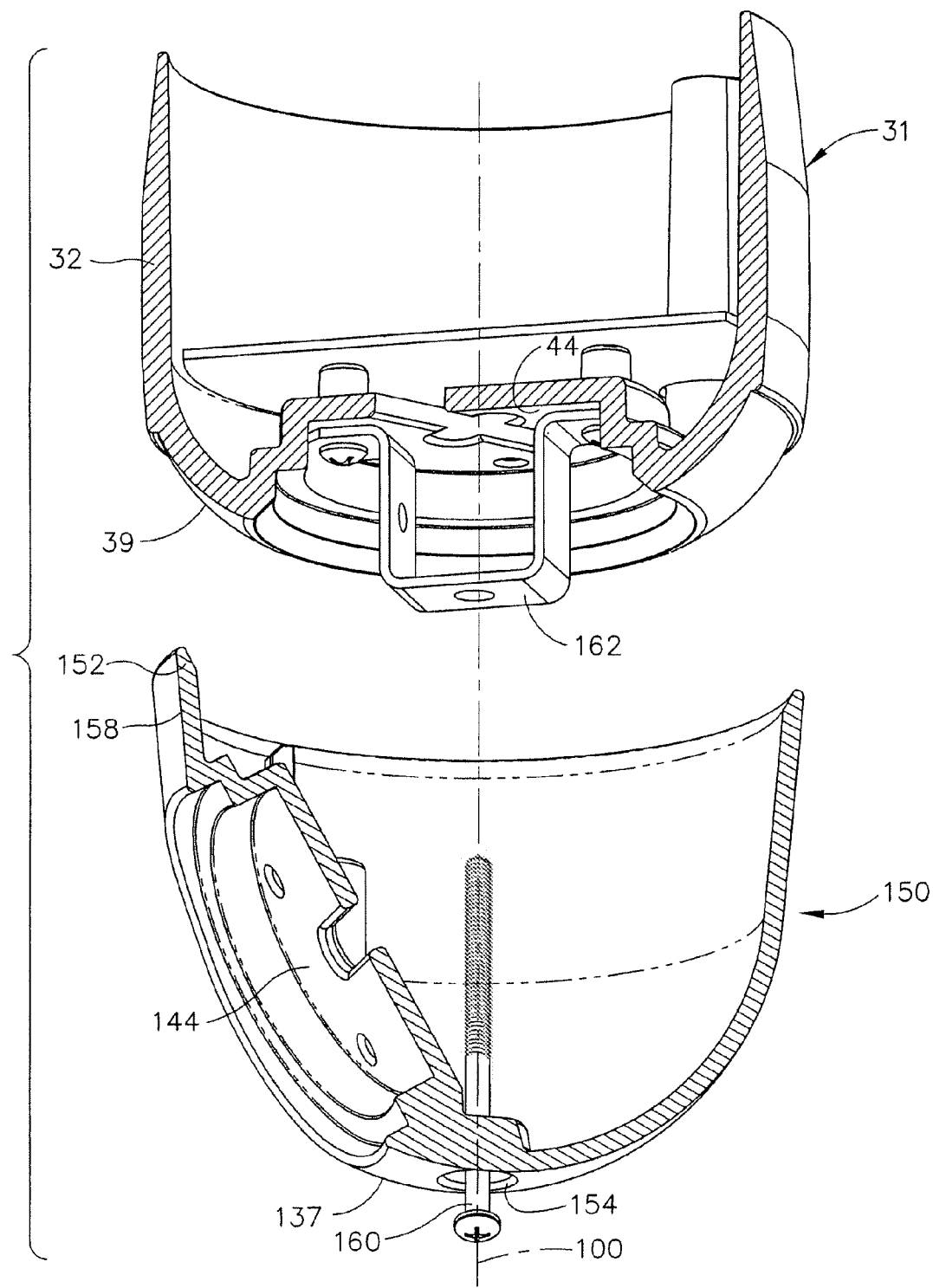
FIG. 6 shows a sectional, exploded view of an embodiment of the lamp device taken through line 6-6 of FIG. 5, showing an internal bracket and bolt for associating the neck base with the lamp head.

Another example of a lamp fixture is shown in a second embodiment. In the second embodiment shown in FIGS. 4-7, the LED lamp device 130 is comprised of the neck base 31 that has the shaped outside surface 34, including a tapered proximal outside surface 35, and a lamp head 150 that is moveably affixed to the distal end 37 of the adapter sleeve. The lamp head 150 has an annular wall 158 having an annular rim 152 that associates with a shoulder 39 on the distal end 37 of the annular wall 32 of the neck base 31, to permit rotation of the lamp head 150 around the centering line 100 of the neck base 31. The lamp head 150 is fixed to the neck base 31 for rotation around the centering line 100 by securement bolt 160 passing through hole 154 in the distal end 137 of the lamp head. The bolt 160 threads into securing bracket 162 mounted into the inner recess 44 of the neck base 31. As shown in FIG. 6, the securing bracket 162 is affixed to the inner recess 44 with bolts. The securement bolt 160 can be loosened sufficiently to permit rotation of the lamp head 150 around the centering line 100 relative to the stationary neck base 31, and then threaded down to fix the lamp head 150 against rotation. The lamp head 150 can therefore be rotated to provide the desired radial direction of the light emitted from the LED module.

Each of the annular rim 152 of the lamp head 150 and the shoulder 39 of the neck base 31 is configured and formed to provide a wide area of overlap and interface, thereby ensuring sufficient surface area contact between the two parts so that heat from the LED module 80 can pass to the adapter sleeve and on to the collar 10. The interface can be metal against metal, for example, aluminum against aluminum, to optimize heat transfer between the parts.

Figure 7:
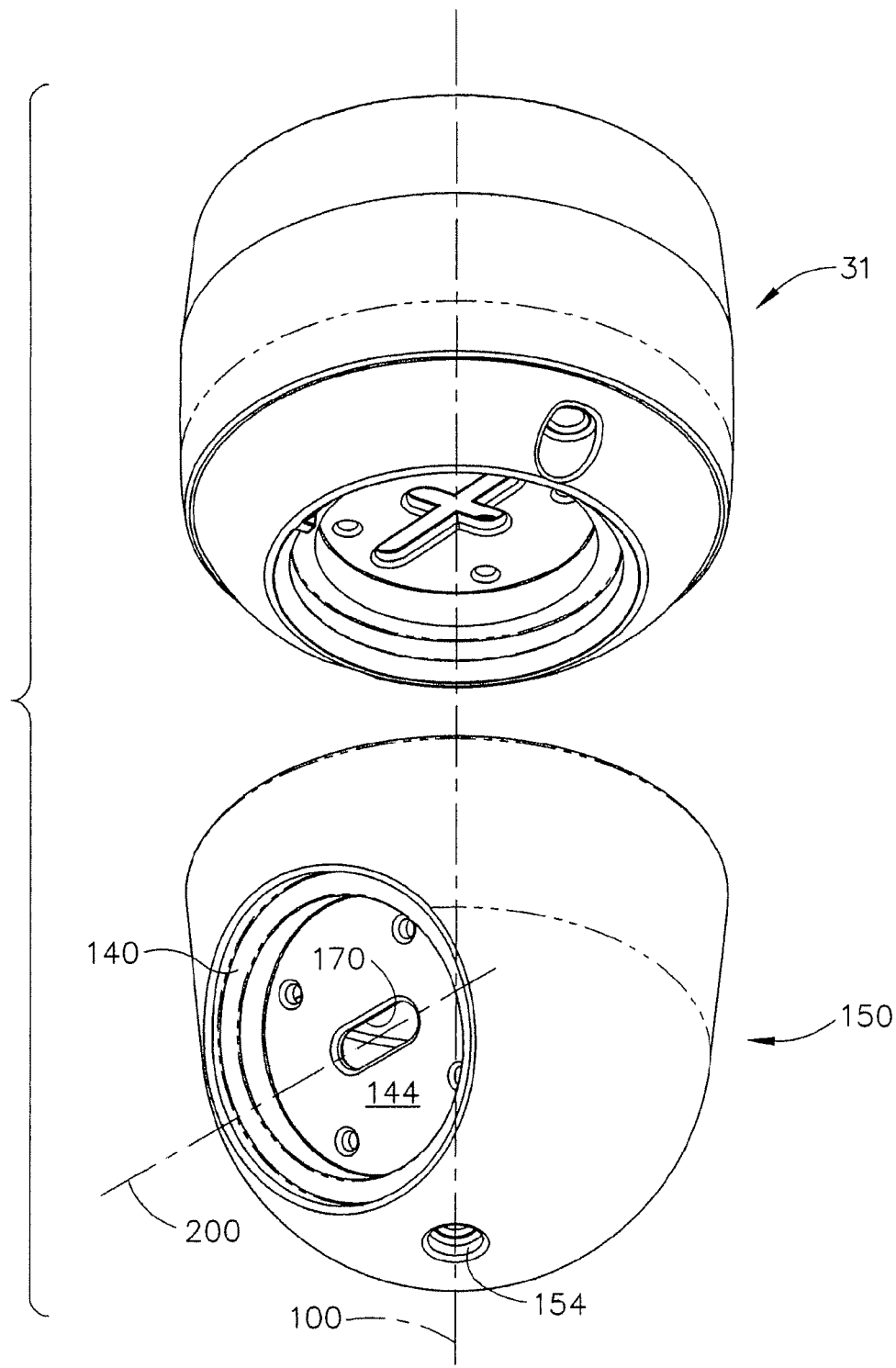
FIG. 7 shows an exploded view of the lamp device of FIG. 5.

The lamp head 150 has the first recess 144 formed in the distal surface to receive the LED module 80. As shown in FIGS. 5 and 7, the LED module 80 is disposed offset from the centerline 100 of the lamp head 150. The LED module 80 itself has a centerline 200 disposed at an angle 0 to the axial centering line 100 of the adapter sleeve, the angle 0, in one embodiment, being from about 10° to about 70°.

As in the first embodiment, and as seen in FIG. 7, a second recess 140 is disposed at the distal end of the lamp head 150, concentric with the first recess 144 and substantially centered on the centerline 200 of the LED module 80 (similar to the recesses 40 and 44 of the first embodiment), for retaining the transparent lens 82 and LED module 80, respectively. In the floor of the recess 144 is an opening 170 through which pass electrical wiring for power and control of the LEDs.

Figure 8:
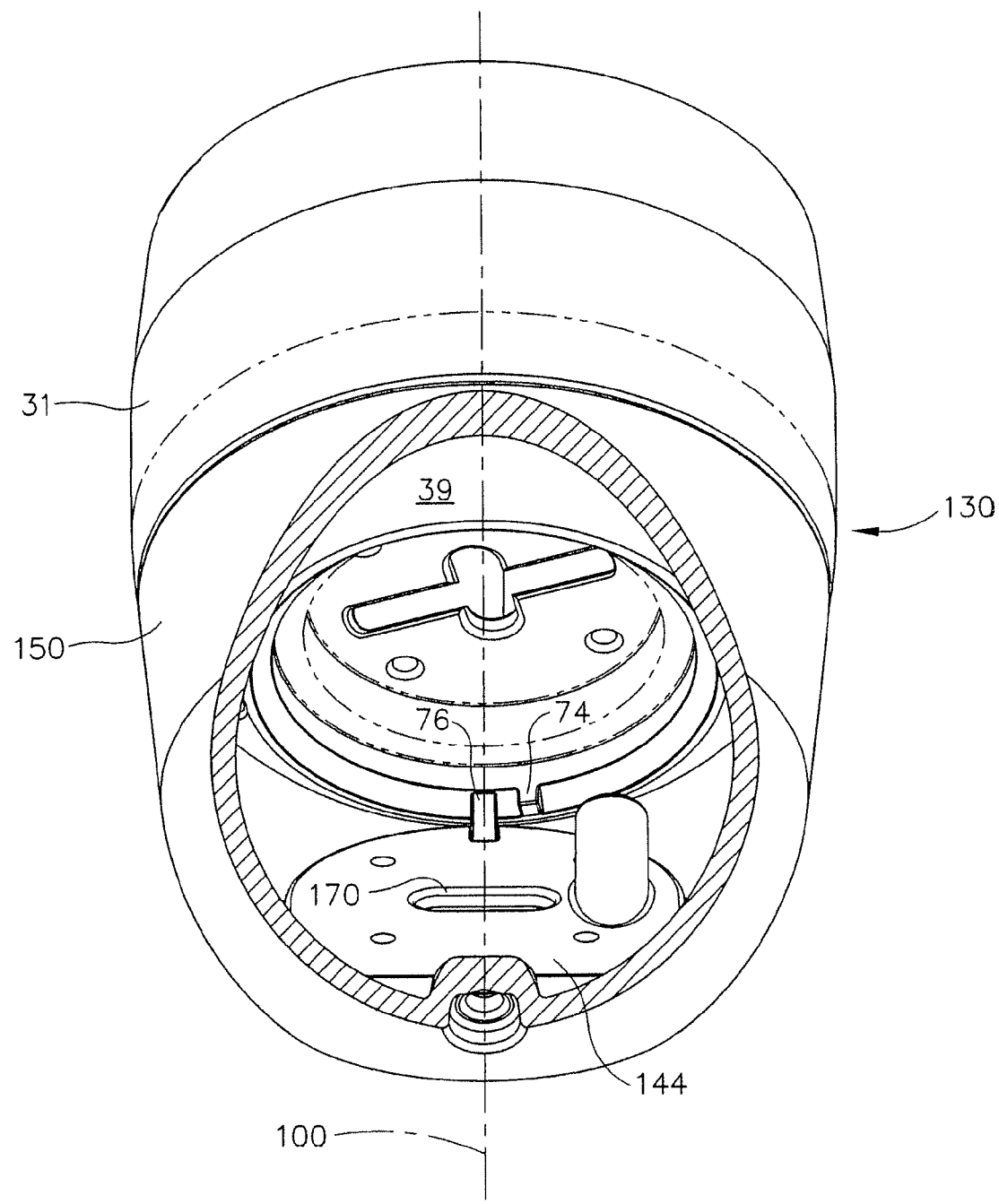
FIG. 8 shows a partial sectional view of the lamp device of FIG. 5 taken through line 8-8 of FIG. 5
Figure 9:
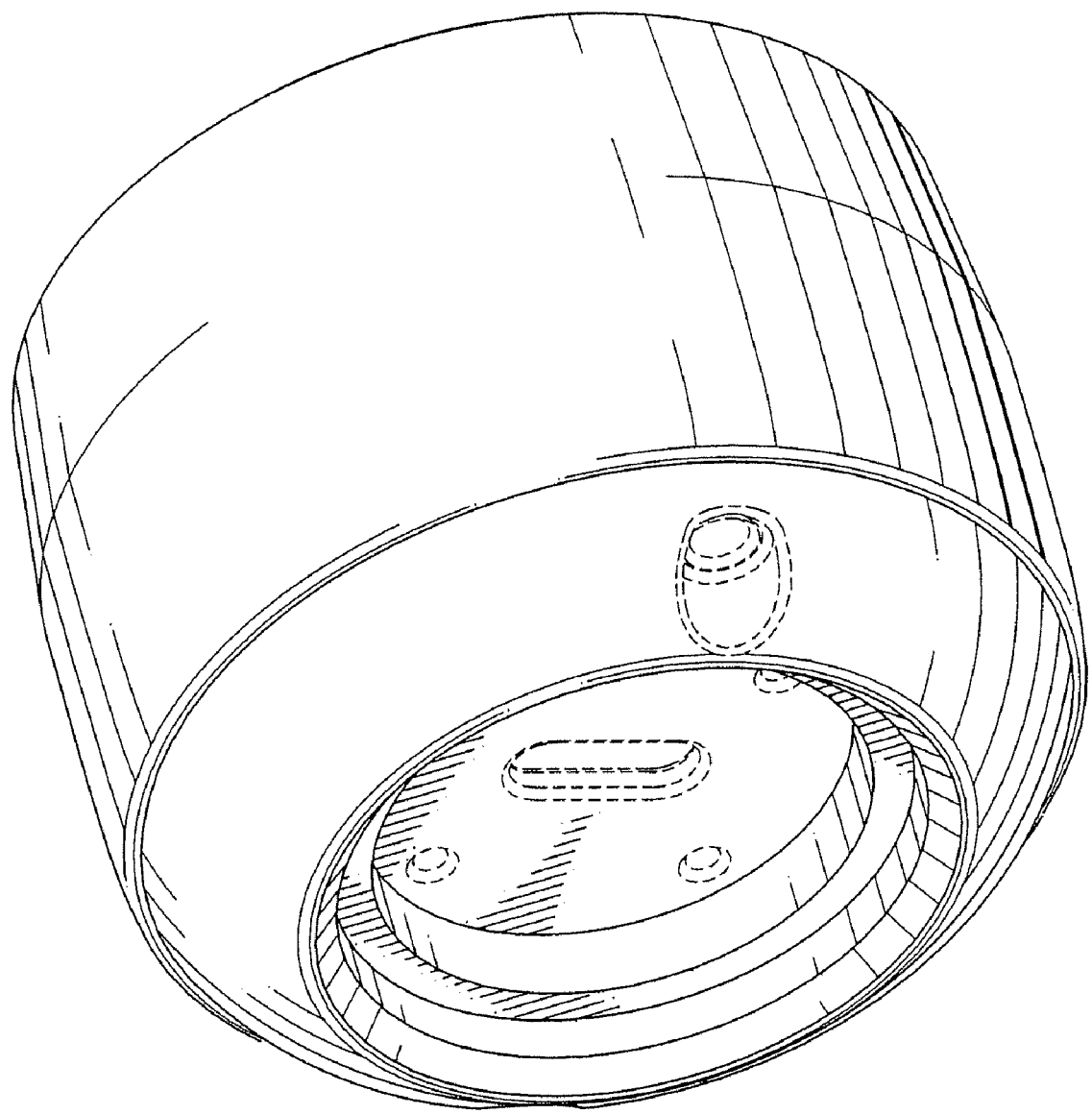
FIG. 9 is a perspective view of the ornamental characteristics of a first embodiment of the lamp device.
Figure 10:
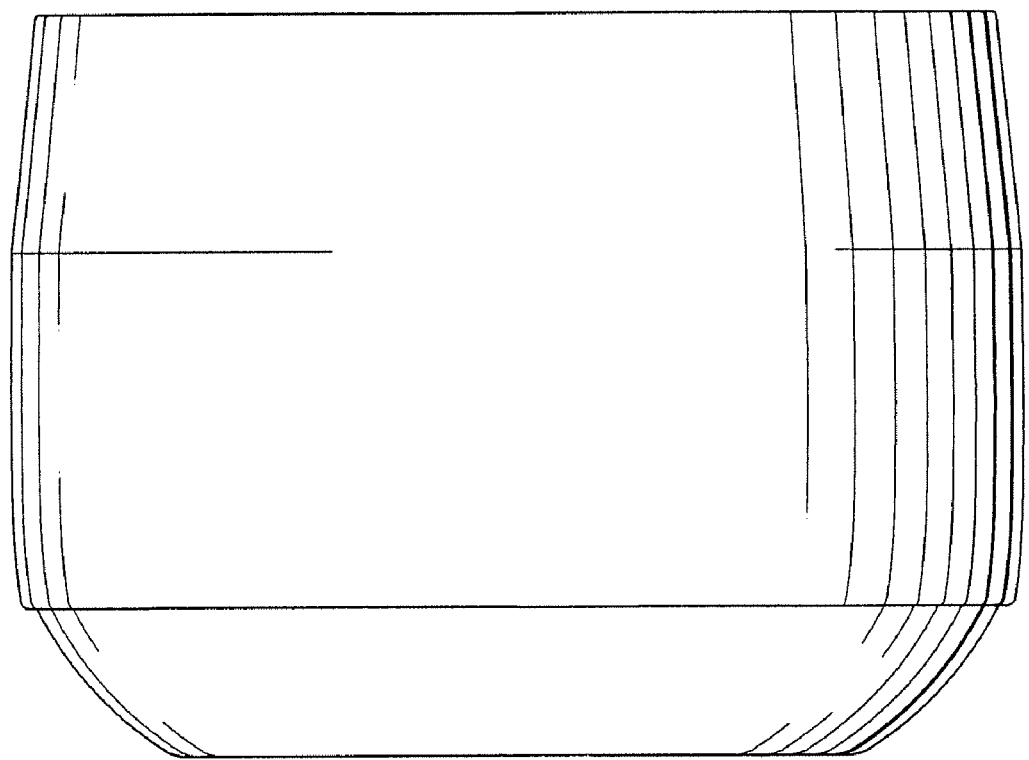
FIG. 10 is a front and back view of the lamp device of FIG. 9.
Figure 11:
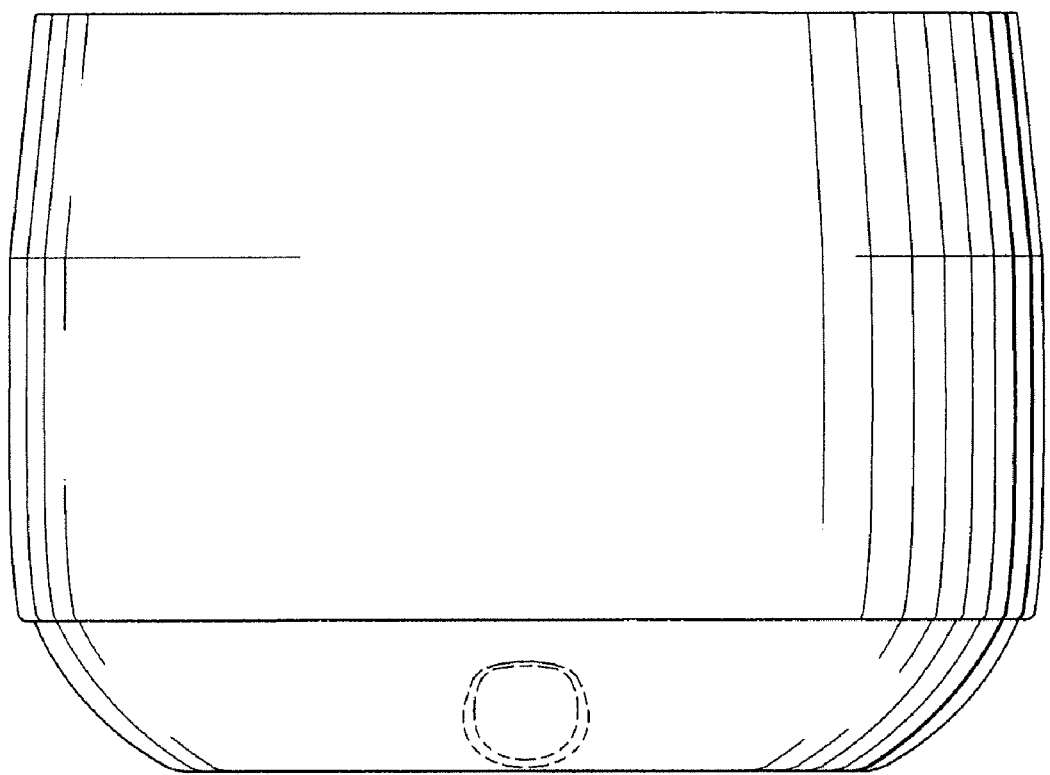
FIG. 11 is a right side and left side view of the lamp device of FIG. 9.
Figure 12:
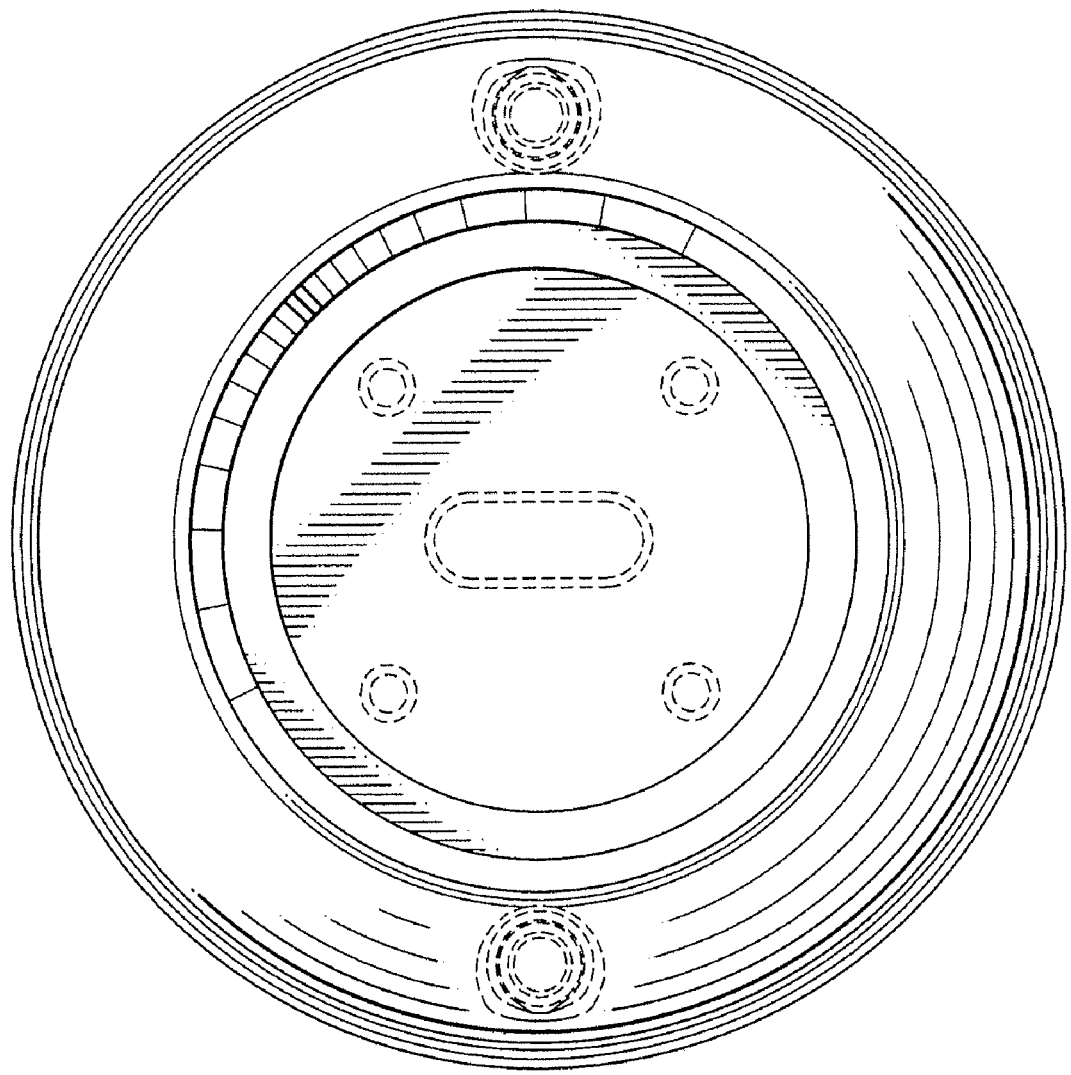
FIG. 12 is a top view of the lamp device of FIG. 9.
Figure 13:
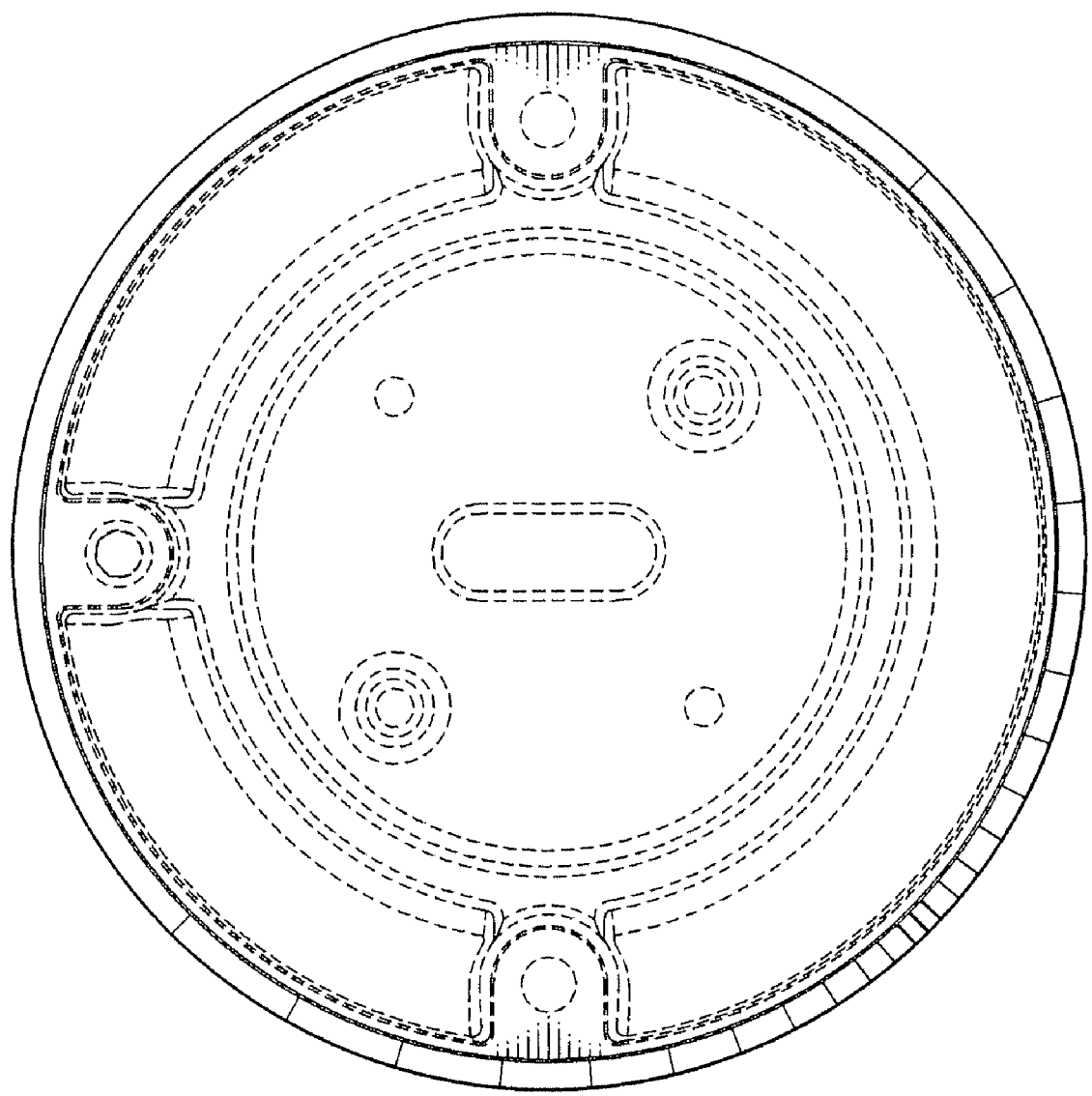
FIG. 13 is a bottom view of the lamp light device of FIG. 9.
Figure 14:
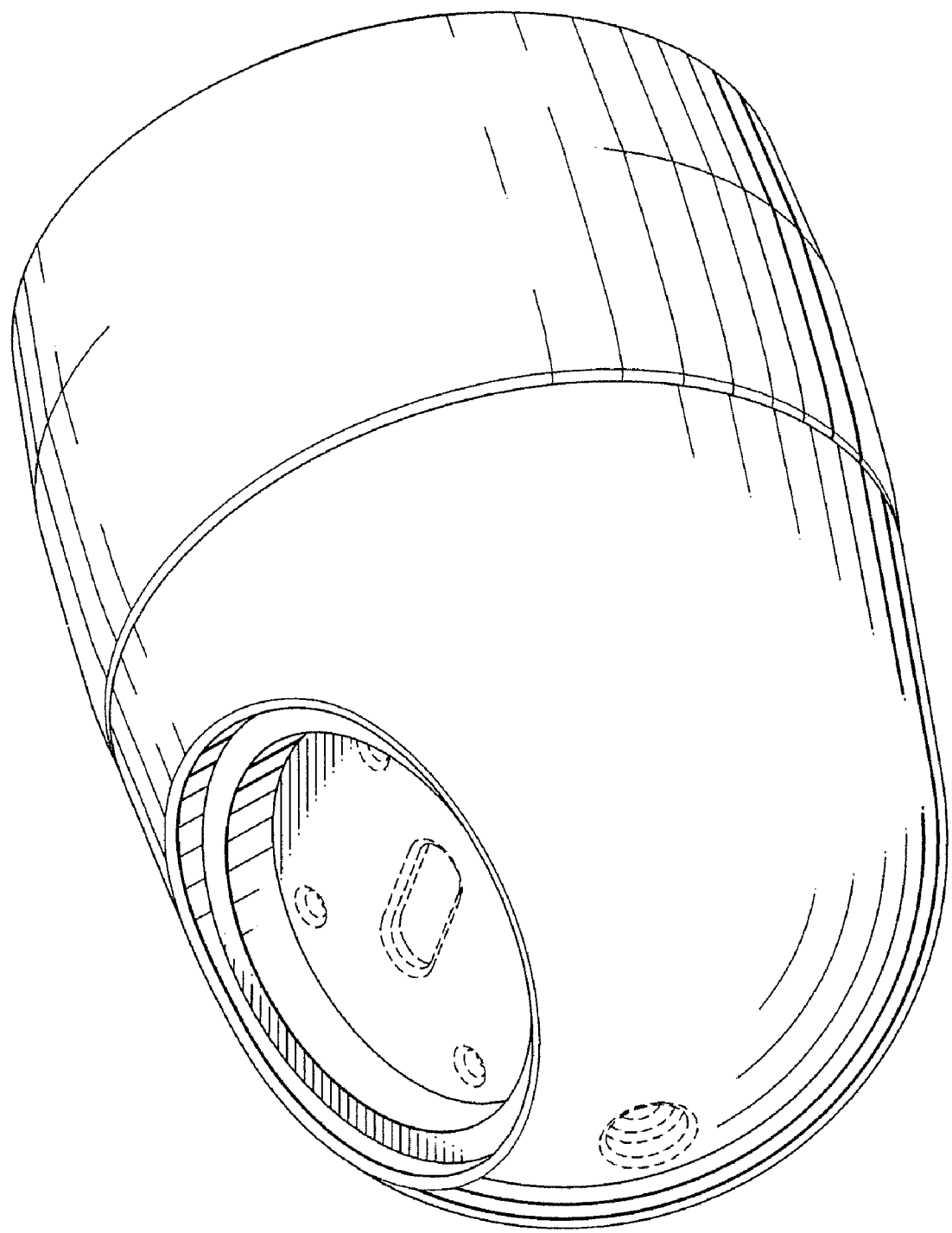
FIG. 14 is a perspective view of a second embodiment of the ornamental characteristics of the lamp device.
Figure 15:
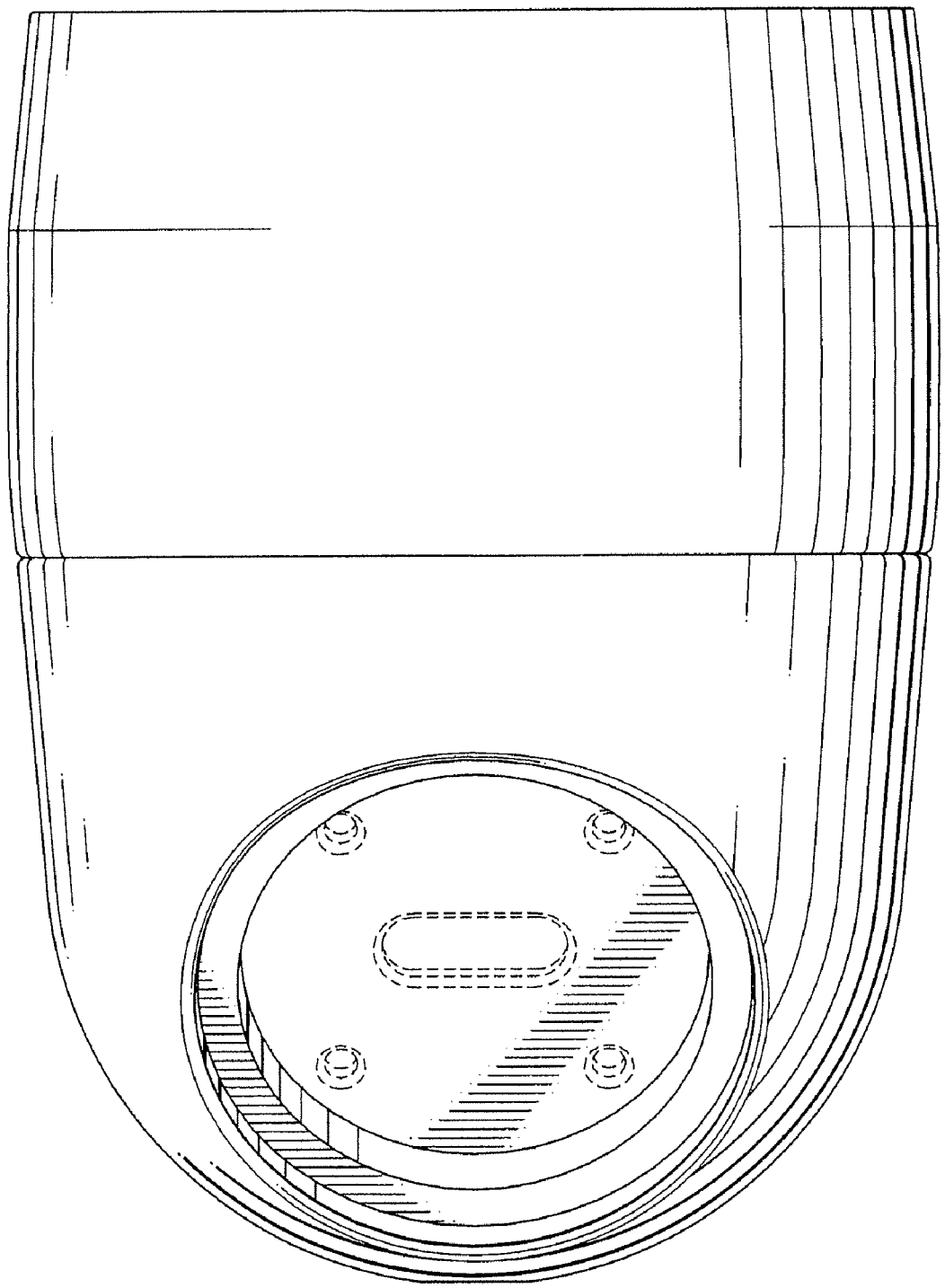
FIG. 15 is a front view of the lamp device of FIG. 14.
Figure 16:
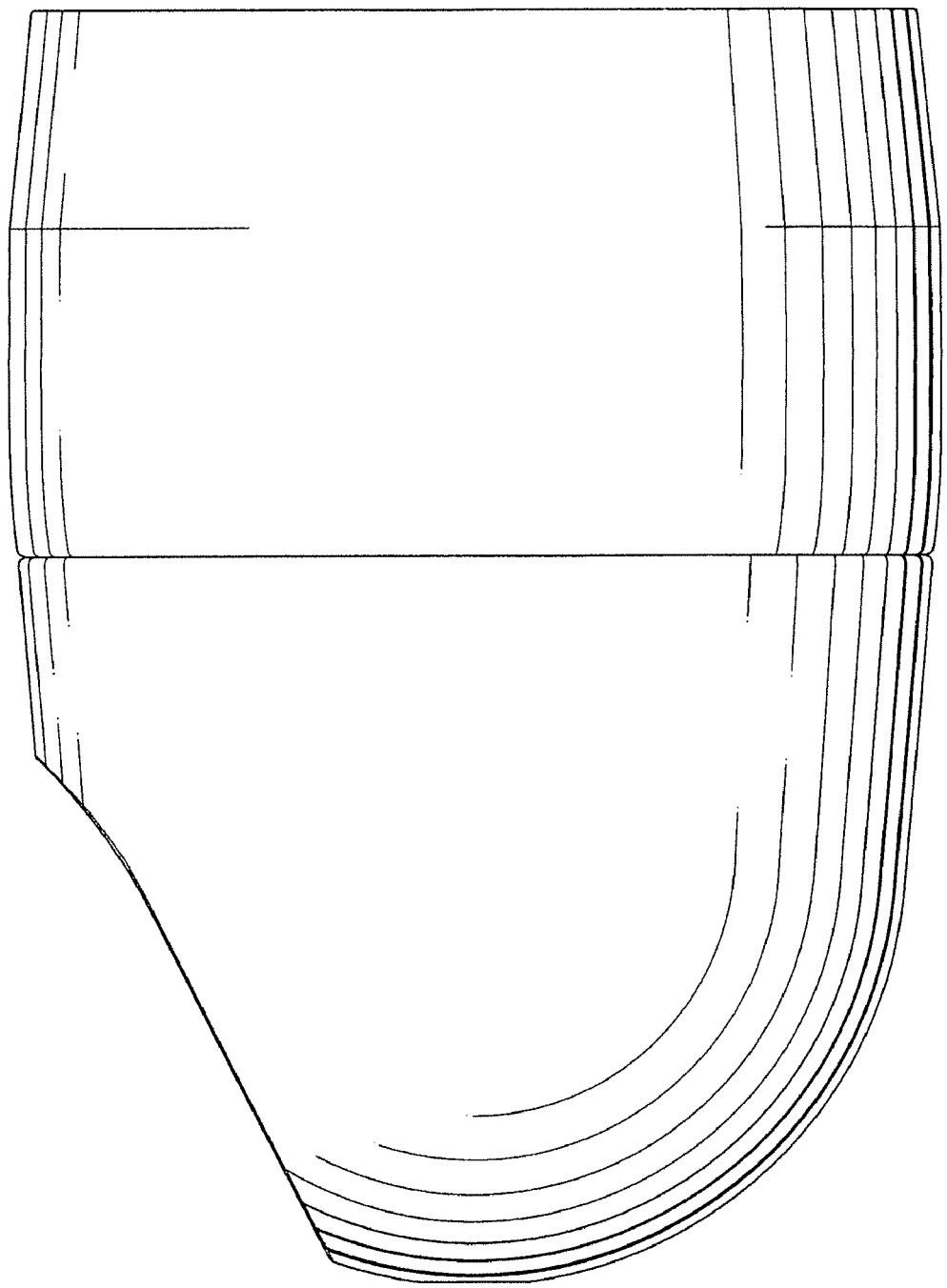
FIG. 16 is a right side view of the lamp device of FIG. 14; the left side view is the mirror image.
Figure 17:
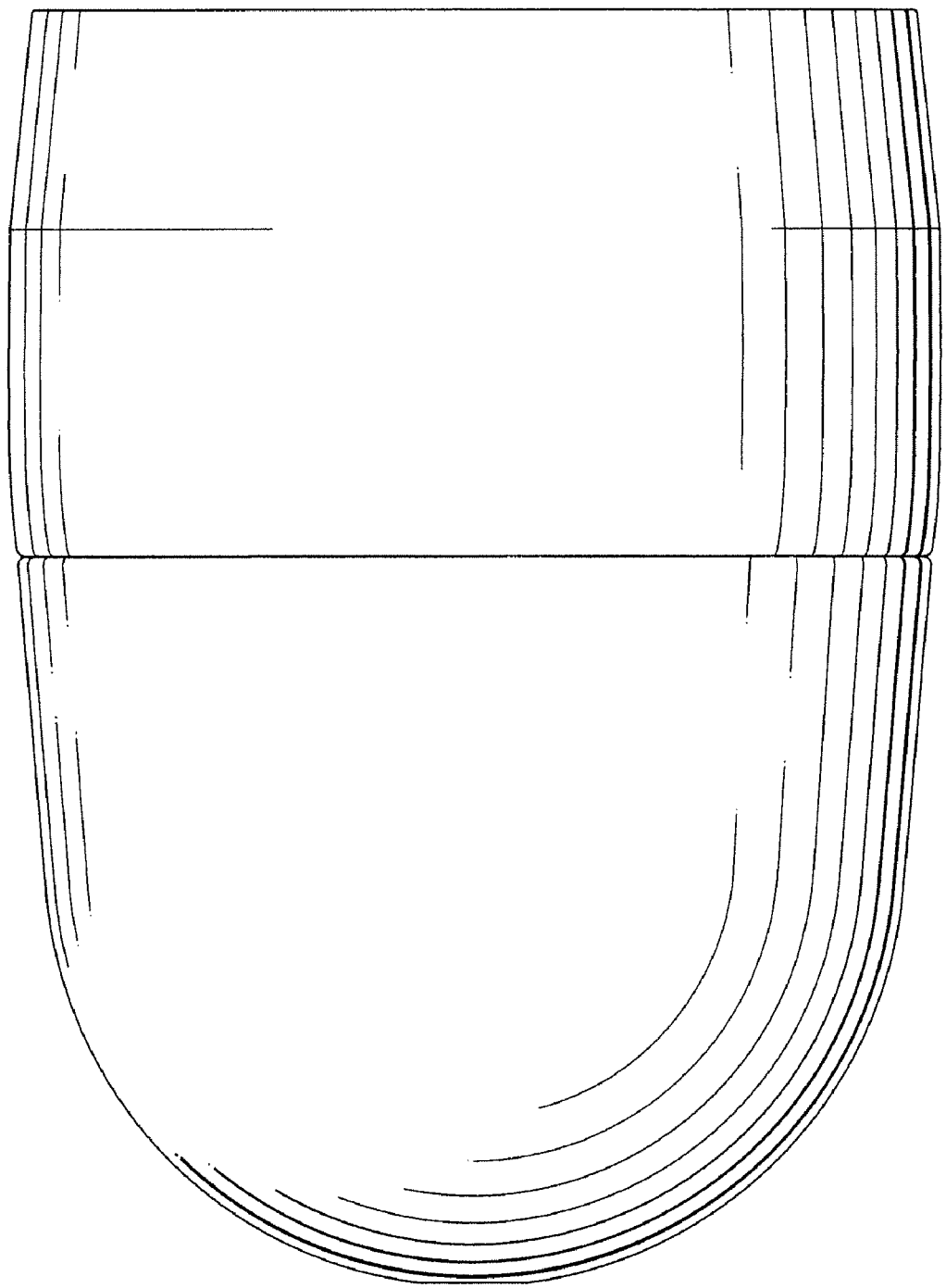
FIG. 17 is a back view of the lamp device of FIG. 14.
Figure 18:
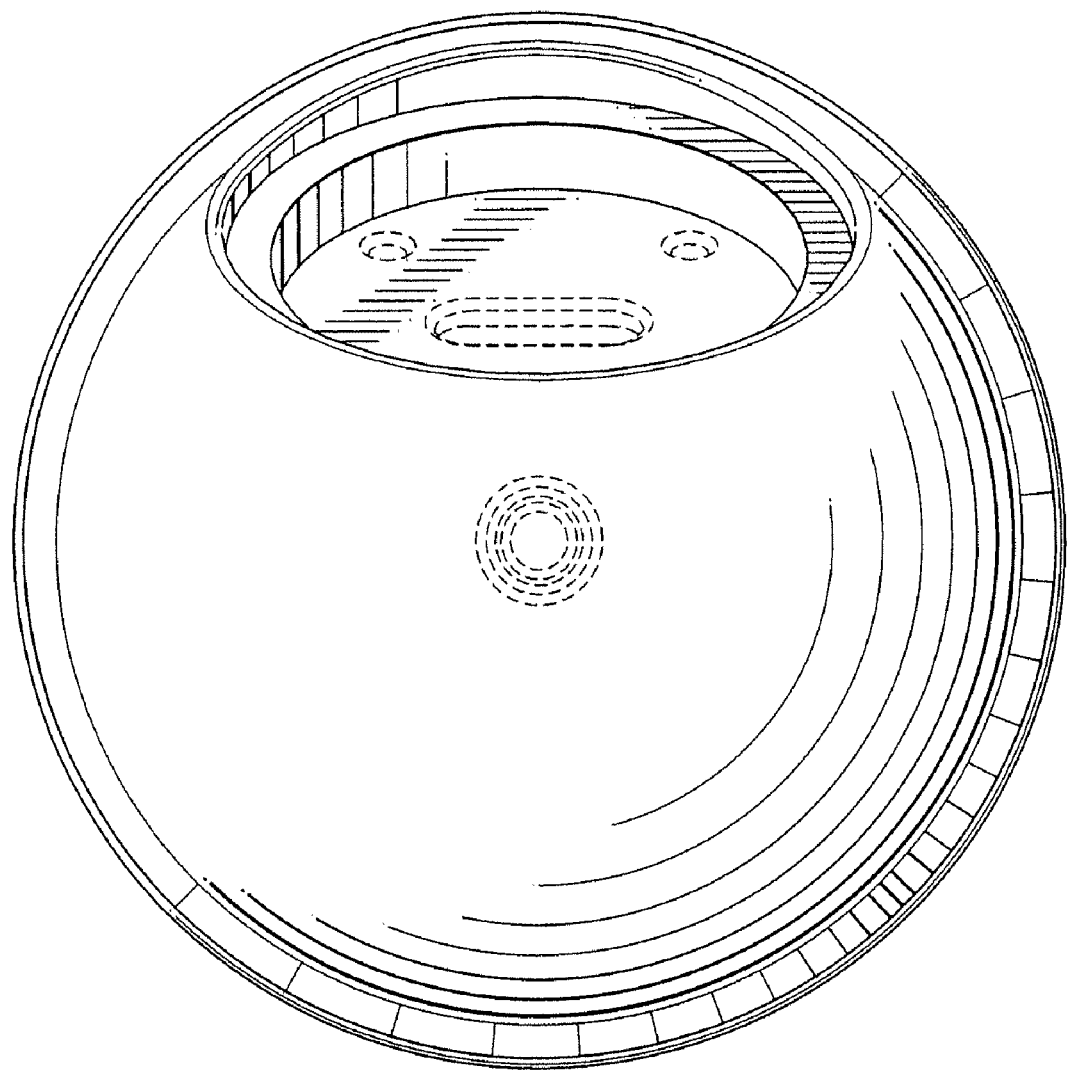
FIG. 18 is a top view of the lamp device of FIG. 14.
Figure 19:
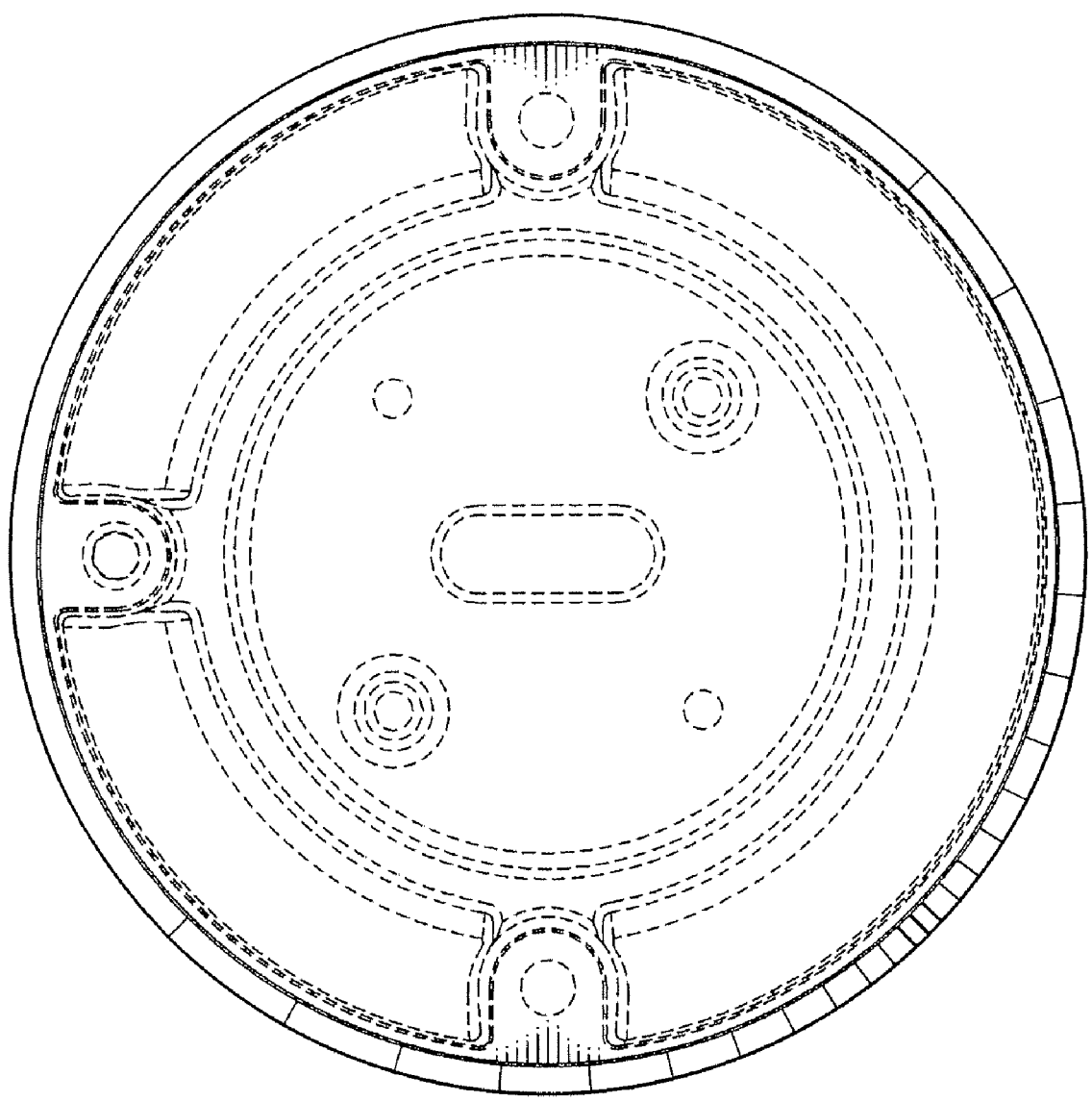
FIG. 19 is a bottom view of the lamp device of FIG. 14.

The LED lamp device 130 has a means for preventing over-rotation of the lamp head 150 about the neck base 31 that prevents the internal wiring of the LED module 80 from tangling. FIG. 8 shows an embodiment of an over-rotation prevention means consisting of a pair of rotation stops 74 and 76 that prevent the lamp head 150 from rotating more than 360 degrees around the neck base 31. The first rotation stop 74 is positioned on an inside surface of the shoulder 39 of the neck base 31, and the second rotation stop 76 is positioned on the underside of the floor of recess 144 of the lamp head 150. Other known means for preventing over-rotation of the lamp head 150 can be used.

The LED lamp device are, in one embodiment, made by casting aluminum by methods such as die casting, permanent mold casting or sand casting. Other metals can be used such as bronze and brass. The parts can also be formed by machining the metal stock. The parts can also be made of plastic materials that have high heat transfer values, by injection molding.

In the illustrated designs illustrated in FIGS. 9-19, the broken lines show environment, and form no part of the claimed design.

While the various aspects have been disclosed by reference to the details of preferred embodiments, it is to be understood that the disclosure is intended in an illustrative rather than in a limiting sense, as it is contemplated that modifications will readily occur to those skilled in the art, within the spirit of the invention and the scope of the appended claims.

I claim:

1. A lighting fixture securable to a structure having an electrical power source, comprising:
   1) a collar having an annular wall and a base securable to the structure;
   2) a shade having a frustum extending from a distal end of the collar;
   3) a replaceable lamp comprising an annular wall and a distal end extending from the annular wall, the annular wall having a shaped outside surface in direct surface contact with an inner surface of the annular wall of the collar, to establish a heat-transferring interface between the lamp and the collar to dissipate heat through the shade, the lamp configured to be insertable in the fixture without requiring removal of the collar or shade;
   4) a light module comprising at least one light source disposed at the distal end of the lamp, wherein the collar need not conduct electricity to cause light to emit from the at least one light source.

2. The fixture according to claim 1 wherein the collar is made of a material having a thermal conductivity of at least 50 W/mK.

3. The fixture according to claim 1 wherein the lamp further has a first recessed level formed into the distal end to receive the light module.

4. The fixture according to claim 3 wherein the first recessed level has an elongated slot having a length and a width sufficiently sized to allow passing therethrough the light module, and having at least one secondary slot extending transversely from a middle portion along the length of the elongated slot.

5. The fixture according to claim 1 the outside surface of the lamp annular wall having a first surface portion that is substantially cylindrical about a centerline of the lamp, and a second surface portion that has at least one frustoconical surface that tapers toward the centerline.

6. The fixture of claim 1, wherein the light source comprises an LED.

7. The fixture according to claim 6, wherein a power unit, a control unit, and the LED are mounted on a printed circuit board within the lamp.

8. The fixture according to claim 1, wherein the lamp further comprises a power unit and a control unit.

9. The fixture according to claim 1, wherein the light module comprises a reflective coverplate.

10. The fixture of claim 1 wherein the heat from the light module is in direct thermal communication to the collar via the lamp annular wall.

11. A lamp for retrofitting into a conventional lamp fixture that has a collar that has a base, an annular outer wall extending out from the base, and a shade extending from a distal end of the collar the lamp comprising an annular wall and a distal end extending from the annular wall, the annular wall defining an outermost perimeter of the lamp and having a shaped outside surface that is placed into direct surface contact with an inner surface of the annular outer wall of the collar, to establish a heat-transferring interface between the lamp and the collar, and the distal end of the lamp configured to receive a light module comprising at least one light source, wherein the collar need not conduct electricity to cause light to emit from the at least one light source.

12. The lamp according to claim 11, made from a material having a heat transfer coefficient of at least 50 W/mK.

13. The lamp according to claim 11, further having a first recessed level formed into the distal end to receive the light module.

14. The lamp according to claim 11 wherein the outside surface of the annular wall has a first surface portion that is substantially cylindrical about a centerline of the lamp, and a second surface portion that has at least one frustoconical surface that tapers toward the centerline.

15. The lamp of claim 11, wherein the light source comprises an LED.

16. The lamp according to claim 15, wherein a power unit, a control unit, and the LED are mounted on a printed circuit board within the lamp device.

17. The lamp according to claim 11, wherein the lamp comprises a power unit and a control unit.

18. The lamp according to claim 11, wherein the light module comprises a reflective coverplate.

19. The lamp of claim 11 wherein the heat from the light module is in direct thermal communication to the collar via the lamp annular wall.

20. A method for retrofitting an existing lighting fixture mounted to a structure with a lamp, the fixture having a collar having an annular wall with an inner wall surface, and a base for attaching the lamp fixture to a structure, the method comprising the steps of:
   a. providing a lamp having an annular wall and a distal end extending from the annular wall, the annular wall having a shaped outside annular surface and a light module disposed at the distal end;
   b. affixing the lamp to the fixture, wherein the shaped outside annular surface is placed into direct surface contact with the inner wall surface of the annular wall of the collar while the collar is mounted to the structure, to establish a heat-transferring interface between the lamp and the collar, wherein the collar need not conduct electricity to cause light to emit from the light module.

21. The method according to claim 20 wherein the lamp is made from a material that has a heat transfer coefficient of at least 50 W/mK.

22. The method according to claim 20 wherein the outside surface of the annular wall has a first surface portion that is substantially cylindrical about a centerline of the lamp, and a second surface portion that has at least one frustoconical surface that tapers toward the centerline.

23. The method of claim 20, wherein the connecting comprises connecting the electrical power source to the light module to provide power to an LED.

24. The method of claim 20 wherein the electrical power source is connected to a power unit on a printed circuit board within the light module.

25. The method of claim 20 wherein step b places the heat from the light module is in direct thermal communication to the collar via the lamp annular wall.

26. A lighting fixture comprising:
   1) a collar having an annular wall, a base and a shade extending from a distal end of the collar;
   2) a replaceable lamp comprising an annular wall and a distal end extending from the annular wall, the annular wall having a length being circumscribed along its entirety by the collar and having a shaped outside surface along at least a portion of the length in direct surface contact with an inner surface of the annular wall of the collar to establish a heat-transferring interface between the lamp and the collar to dissipate heat through the shade; and
   3) a light module comprising at least one light source disposed at the distal end of the lamp.

27. The fixture of claim 26 wherein the collar is made of a material having a thermal conductivity of at least 50 W/mK.

28. The fixture of claim 26 wherein the lamp further has a first recessed level formed into the distal end to receive the light module.

29. The fixture of claim 28 wherein the first recessed level has an elongated slot having a length and a width sufficiently sized to allow passing therethrough the light module, and having at least one secondary slot extending transversely from a middle portion along the length of the elongated slot.

30. The fixture of claim 26 the outside surface of the lamp annular wall having a first surface portion that is substantially cylindrical about a centerline of the lamp, and a second surface portion that has at least one frustoconical surface that tapers toward the centerline.

31. The fixture of claim 26, wherein the light source comprises an LED.

32. The fixture of claim 26 wherein the heat from the light module is in direct thermal communication to the collar via the lamp annular wall.

33. A lighting fixture securable to a structure having an electrical power source, comprising:
   1) a collar having an annular wall and a base securable to the structure, the collar exposed to ambient air;
   2) a shade having a frustum extending from a distal end of the collar;
   3) a lamp comprising an annular wall and a distal end extending from the annular wall, the annular wall and distal end defining a cup, the annular wall having a shaped outside surface in direct surface contact with an inner surface of the annular wall of the collar, to establish a heat-transferring interface between the lamp and the collar to dissipate heat through the shade, the lamp configured to be insertable in the fixture without requiring removal of the collar or shade;
   4) a light module comprising at least one light source disposed at the distal end of the lamp.

34. The fixture according to claim 33 wherein the collar is made of a material having a thermal conductivity of at least 50 W/mK.

35. The fixture according to claim 33 wherein the lamp further has a first recessed level formed into the distal end to receive the light module.

36. The fixture according to claim 35 wherein the first recessed level has an elongated slot having a length and a width sufficiently sized to allow passing therethrough the light module, and having at least one secondary slot extending transversely from a middle portion along the length of the elongated slot.

37. The fixture according to claim 33 the outside surface of the lamp annular wall having a first surface portion that is substantially cylindrical about a centerline of the lamp, and a second surface portion that has at least one frustoconical surface that tapers toward the centerline.

38. The fixture of claim 33, wherein the light source comprises an LED.

39. The fixture according to claim 38, wherein a power unit, a control unit, and the LED are mounted on a printed circuit board within the lamp.

40. The fixture according to claim 33, wherein the lamp further comprises a power unit and a control unit.

41. The fixture according to claim 33, wherein the light module comprises a reflective coverplate.

42. The fixture of claim 33 wherein the heat from the light module is in direct thermal communication to the collar via the lamp annular wall.

43. A lamp for retrofitting into a conventional lamp fixture that has a collar exposed to ambient air, the collar having a base, an annular outer wall extending out from the base, and a shade extending from a distal end of the collar the lamp comprising an annular wall and a distal end extending from the annular wall, the annular wall and distal end define a cup, the annular wall defining an outermost perimeter of the lamp and having a shaped outside surface that is placed into direct surface contact with an inner surface of the annular outer wall of the collar, to establish a heat-transferring interface between the lamp and the collar, and the distal end of the lamp configured to receive a light module comprising at least one light source.

44. The lamp according to claim 43, made from a material having a heat transfer coefficient of at least 50 W/mK.

45. The lamp according to claim 43, further having a first recessed level formed into the distal end to receive the light module.

46. The lamp according to claim 43 wherein the outside surface of the annular wall has a first surface portion that is substantially cylindrical about a centerline of the lamp, and a second surface portion that has at least one frustoconical surface that tapers toward the centerline.

47. The lamp of claim 43, wherein the light source comprises an LED.

48. The lamp according to claim 43, wherein the lamp comprises a power unit and a control unit.

49. The lamp according to claim 43, wherein the light module comprises a reflective coverplate.

50. The lamp according to claim 43, wherein a power unit, a control unit, and the LED are mounted on a printed circuit board within the lamp device.

51. The lamp of claim 43 wherein the heat from the light module is in direct thermal communication to the collar via the lamp annular wall.

52. A method for retrofitting an existing lighting fixture mounted to a structure with a lamp, the fixture having a collar exposed to ambient air and having an annular wall with an inner wall surface, and a base for attaching the lamp fixture to a structure, the method comprising the steps of:
   a. providing a lamp having an annular wall and a distal end extending from the annular wall, the annular wall and distal end define a cup, the annular wall having a shaped outside annular surface and a light module disposed at the distal end;
   b. affixing the lamp to the fixture, wherein the shaped outside annular surface is placed into direct surface contact with the inner wall surface of the annular wall of the collar while the collar is mounted to the structure, to establish a heat-transferring interface between the lamp and the collar.

53. The method according to claim 52 wherein the lamp is made from a material that has a heat transfer coefficient of at least 50 W/mK.

54. The method according to claim 52 wherein the outside surface of the annular wall has a first surface portion that is substantially cylindrical about a centerline of the lamp, and a second surface portion that has at least one frustoconical surface that tapers toward the centerline.

55. The method of claim 52, wherein the connecting comprises connecting the electrical power source to the light module to provide power to an LED.

56. The method of claim 52 wherein the electrical power source is connected to a power unit on a printed circuit board within the light module.

57. The method of claim 52 wherein step b places the heat from the light module is in direct thermal communication to the collar via the lamp annular wall.

* * * * *